(12) United States Patent
Hurley et al.

(10) Patent No.: US 10,832,393 B2
(45) Date of Patent: Nov. 10, 2020

(54) AUTOMATED TREND DETECTION BY SELF-LEARNING MODELS THROUGH IMAGE GENERATION AND RECOGNITION

(71) Applicant: International Business Machines Corporation, Armonk, NY (US)

(72) Inventors: Steven Hurley, Denton, TX (US); David Verburg, Mantorville, MN (US); Lu Liu, Singapore (SG); Ai K Ang, Anchorvale Link (SG); Sia Kai Julian Tan, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/371,993

(22) Filed: Apr. 1, 2019

(65) Prior Publication Data
US 2020/0311900 A1    Oct. 1, 2020

(51) Int. Cl.
| | |
|---|---|
| *G06T 11/20* | (2006.01) |
| *G06T 7/00* | (2017.01) |
| *G06N 20/00* | (2019.01) |
| *G06K 9/62* | (2006.01) |
| *G08B 21/18* | (2006.01) |

(52) U.S. Cl.
CPC .......... *G06T 7/0002* (2013.01); *G06K 9/6202* (2013.01); *G06K 9/6256* (2013.01); *G06K 9/6267* (2013.01); *G06N 20/00* (2019.01); *G06T 11/206* (2013.01); *G08B 21/18* (2013.01); *G06T 2207/20072* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 6,577,323 | B1 * | 6/2003 | Jamieson | G05B 23/0232 345/440 |
| 7,702,555 | B1 * | 4/2010 | Breeden | G06Q 30/02 705/35 |
| 9,607,366 | B1 | 3/2017 | Brailovskiy et al. | |
| 9,852,524 | B2 * | 12/2017 | Ricci | G06F 3/04842 |
| 2010/0293107 | A1 * | 11/2010 | Sudjianto | G06Q 10/04 705/36 R |

(Continued)

FOREIGN PATENT DOCUMENTS

CN    104398234    8/2016

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Anh-Tuan V Nguyen
(74) *Attorney, Agent, or Firm* — Heslin Rothenberg Farley & Mesiti P.C.; Tihon Poltavets, Esq.

(57) ABSTRACT

A method, computer program product, and a system where a processor(s) obtains data comprising trends recognized by an observer of the system over time; data comprised of more than one vintage. The processor(s) transforms the data measurable dimensions and assigns the transformed data to vintages and to distinct periods of time. The processor(s) generates an image from the transformed data that represents the trends, organized by the distinct periods of times and the vintages.

17 Claims, 12 Drawing Sheets

(56) References Cited

U.S. PATENT DOCUMENTS

| | | | |
|---|---|---|---|
| 2011/0015967 A1* | 1/2011 | Bhattacharya | G06Q 30/012 |
| | | | 705/302 |
| 2013/0041710 A1* | 2/2013 | Civil | G06F 17/18 |
| | | | 705/7.27 |
| 2017/0070415 A1* | 3/2017 | Bell | H04L 41/069 |
| 2017/0169358 A1* | 6/2017 | Choi | G06F 16/9535 |
| 2018/0107169 A1* | 4/2018 | Hu | A62B 35/0093 |
| 2018/0157902 A1* | 6/2018 | Tu | G06K 9/0055 |
| 2018/0189228 A1 | 7/2018 | Park et al. | |
| 2018/0189607 A1 | 7/2018 | Cocias et al. | |
| 2018/0246992 A1* | 8/2018 | Bu | G06F 30/20 |
| 2019/0379589 A1* | 12/2019 | Ryan | G06F 11/3466 |

\* cited by examiner

| BUILT_YEAR_MO_ | 2017 | | | | | VINTAGEINFO |
|---|---|---|---|---|---|---|
| | 08 | 07 | 06 | 05 | 04 | VINTAGE_ |
| 2016-12 | 0.875 | 0.616 | 0.703 | 0.656 | 0.580 | 1219 |
| 2016-11 | 0.523 | 0.358 | 0.302 | 0.287 | 0.269 | 2979 |
| 2016-10 | 2.161 | 1.2 | 1.343 | 1.5 | 1.714 | 100 |
| 2016-09 | 1.067 | 1.095 | 1.154 | 1.249 | 1.338 | 7173 |
| 2016-08 | 0.285 | 0.309 | 0.202 | 0.074 | 0.082 | 3231 |
| 2016-07 | 0.690 | 0.617 | 0.669 | 0.650 | 0.573 | 3139 |
| 2016-06 | 0 | 0 | 0 | 0 | 0 | 26 |
| 2016-05 | 0.223 | 0.296 | 0.256 | 0.275 | 0.298 | 335 |
| 2016-03 | 0.373 | 0.456 | 0.378 | 0.463 | 0.432 | 1784 |
| 2016-02 | 0.670 | 0.660 | 0.672 | 0.798 | 0.752 | 10519 |
| 2016-01 | 1.22 | 1.226 | 1.248 | 1.027 | 0.936 | 2884 |
| 2015-12 | 0.787 | 0.773 | 0.753 | 0.787 | 0.660 | 7913 |
| 2015-11 | 1.005 | 1.030 | 1.197 | 1.100 | 1.041 | 13373 |
| 2015-10 | 1.474 | 1.523 | 1.461 | 1.354 | 1.232 | 2972 |
| 2015-09 | 0.973 | 0.935 | 0.961 | 0.942 | 0.947 | 13614 |
| 2015-08 | 1.163 | 1.116 | 1.115 | 1.056 | 1.056 | 22179 |
| 2015-07 | 1.131 | 1.175 | 1.224 | 0.851 | 0.690 | 245 |
| 2015-06 | 0.922 | 0.912 | 0.925 | 0.819 | 0.860 | 18509 |
| 2015-05 | 0.852 | 0.896 | 0.868 | 0.843 | 0.804 | 8824 |
| 2015-04 | 1.039 | 1.076 | 1.116 | 0.831 | 0.844 | 398 |

| 2016 | | 2017 | | |
|---|---|---|---|---|
| 02 | 01 | 12 | 11 | 10 |
| 2,024 | 2,168 | 1,927 | 0 | 0 |

AUTOMATED TREND DETECTION BY SELF-LEARNING MODELS THROUGH IMAGE GENERATION AND RECOGNITION

BACKGROUND

Human expertise in various areas produces vastly different results than utilizing computer-based approaches to address the same issue. One such example where results deviate is in trend detection, specifically, series data trend detection. Detection of trends over a time series is arguably more complex than recognizing an image of a pre-defined object (e.g., an apple) in an image taken at a given moment in time. In series trend detection, results between a human and existing computerized approaches differ. The way multi-vintage trend data is represented to an expert human is typically different than the way the data is represented to an expert system. A vintage comprises a collection of contemporaneous and similar persons or things. Expert humans interact with data through their senses, often visually, and recognizes patterns within the observation (i.e., the sensing of an individual observation). So-called existing expert computing systems typically interact with data through multi-dimensional vectors where a single vector captures the various variables whose values represent a specific observation. This difference in how computing systems interact and learn from multi-vintage trend data and how expert humans interact with that data increases the difficulty in achieving comparable results over both systems.

SUMMARY

Shortcomings of the prior art are overcome and additional advantages are provided through the provision of a method for generating an image representing observed system trends that can be used to train a cognitive system. The method includes, for instance: obtaining, by one or more processors, data comprising trends recognized by an observer of the system over time, wherein the data is comprised of more than one vintage; transforming, by the one or more processors, the data comprising the trends into measurable dimensions, wherein the transforming further comprises assigning the transformed data to vintages and to distinct periods of time; and generating, by the one or more processors, from the transformed data assigned to the vintages, an image, wherein the image represents the trends, organized by the distinct periods of times and the vintages.

Shortcomings of the prior art are overcome and additional advantages are provided through the provision of a computer program product for generating an image representing observed system trends that can be used to train a cognitive system. The computer program product comprises a storage medium readable by a processing circuit and storing instructions for execution by the processing circuit for performing a method. The method includes, for instance: obtaining, by one or more processors, data comprising trends recognized by an observer of the system over time, wherein the data is comprised of more than one vintage; transforming, by the one or more processors, the data comprising the trends into measurable dimensions, wherein the transforming further comprises assigning the transformed data to vintages and to distinct periods of time; and generating, by the one or more processors, from the transformed data assigned to the vintages, an image, wherein the image represents the trends, organized by the distinct periods of times and the vintages.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 illustrates a portion of a data set that can be utilized by the program code in various embodiments of the present invention;

DETAILED DESCRIPTION

Figure 1:
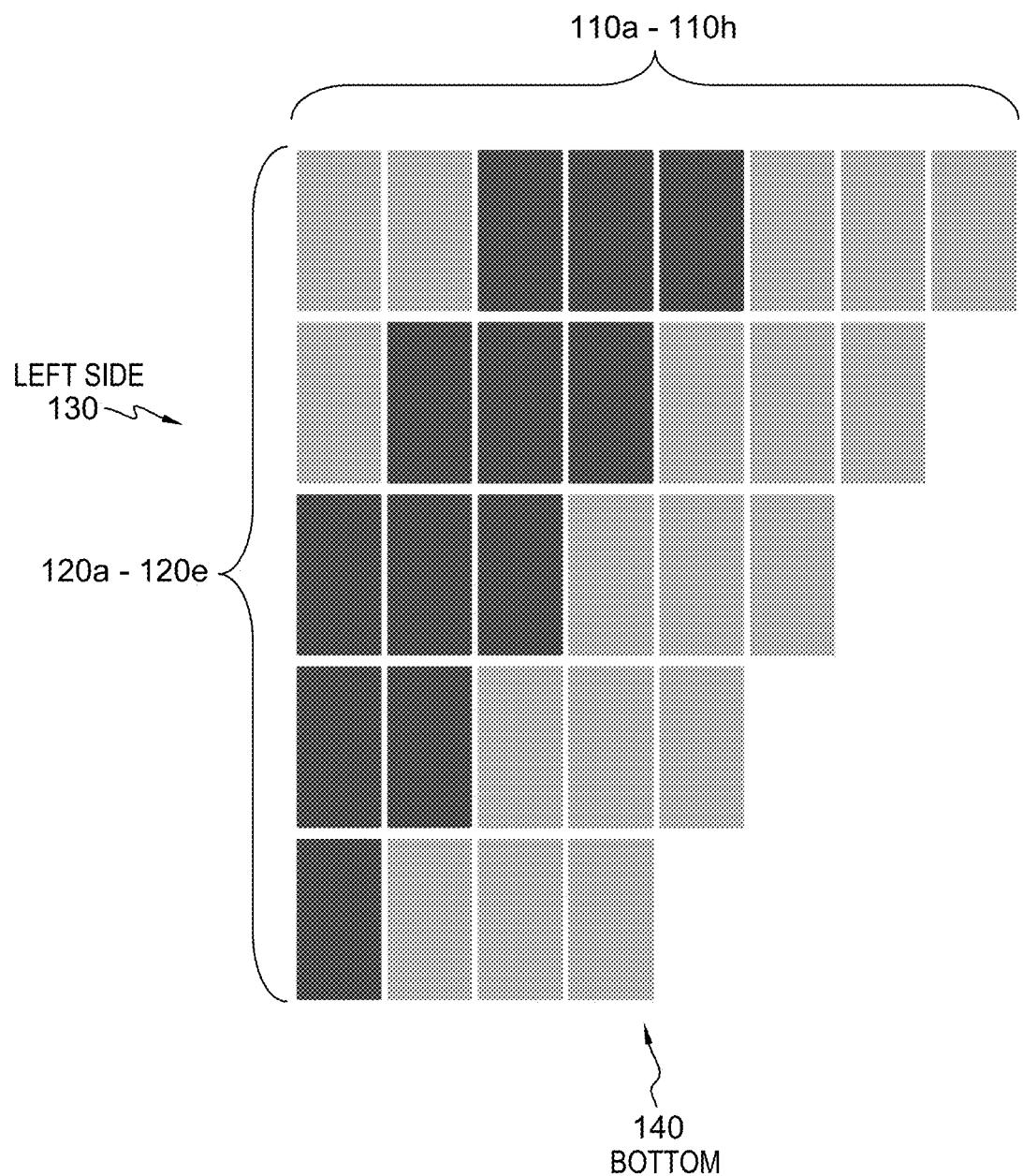
FIG. 1 illustrates various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 11:
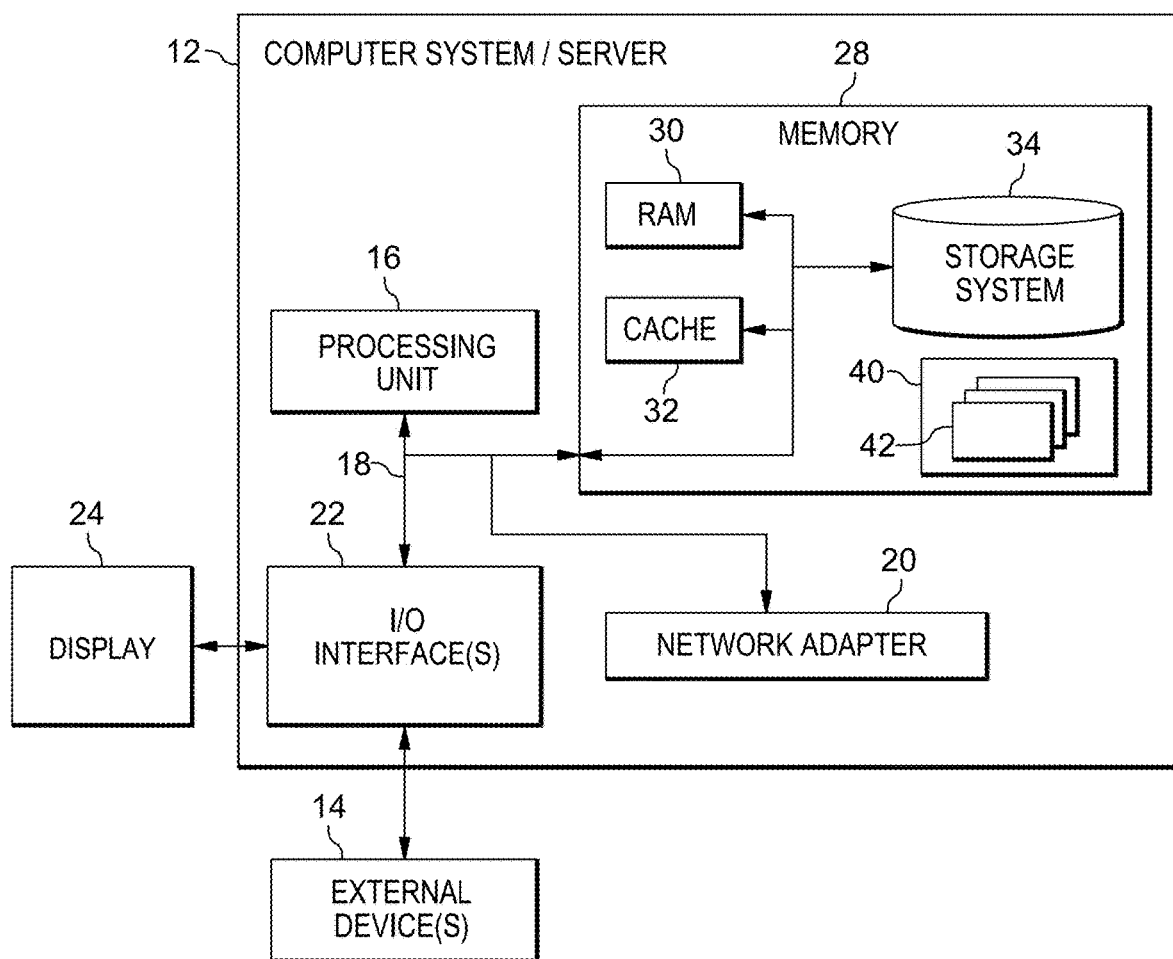
FIG. 11 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 11 as program/utility 40, having a set (at least one) of program modules 42, may be stored in memory 28.

Humans and existing computing systems utilize varied approaches to multivariate problems, sometimes resulting in incompatible results. A human approaches a multivariate problem by observing and analyzing the current data and then mentally forming a "2 or 3 dimensional picture." This approach works provided that the data involved is limited because when the number of variable exceeds a relatively low number (e.g., 5-10), the human mind can than no longer process the data effectively and accurately. As discussed above, computerized approaches to these analyses differ and can lead to different results. However, aspects of various embodiments of the present invention include aspects of this "human" approach without the limitations that the human introduces into the approach. Specifically, in embodiments of the present invention, the program code performs multivariate analysis by generating an image encapsulating underlying data and utilizing existing imagine training and recognition techniques to train a computing model to perform the analysis.

Embodiments of the present invention include a computer-implemented method, a computer program product, and a computer system that include program code executed on at least one processing circuit that utilize image generation and image recognition to detect trends over time. The program code obtains time series trend data and generates images that represent a data set, based on the time series trend data. The image generated by the program code mirrors the way an expert human would visually recognize patterns. This image-based depiction is reversible meaning that the program code can recreate the underlying image data set from the generated image. The program code replicates a human approach to multi-variate data analysis by training a computer system (e.g., machine learning models) to generate these comparable results.

In embodiments of the present invention, program code executing on at least one processor combines data with image training and recognition techniques to generate images representing a trend and trains a computing system using these multi-variate images. To train the system to perform trend recognition that produces results that approximate analyses performed by a human expert, the program code: 1) represents multiple time series trend data as images for use in training and operating the computer system; 2) utilizes the image-based representations of trend data to train the computer system; 3) compares multiple related time series data sets, while fully preserving the entire data set within an image; and 4) trains the computer system by training machine learning models on the same representations used by expert humans. In some embodiments of the present invention, the program code utilizes the aforementioned image generation when it captures details of a group of multiple time series vintage data sets within individual pixels or groups of pixels. The aggregation of individual pixels or groups of pixels would be recognizable to the expert human and also usable by the computer system. Thus captured image, usable by the expert system, enables easy validation and or reclassification by an expert human. Embodiments of the present invention enable rapid creation of computing system models (machine learning models trained by the program code and utilized in the computer system) whose accuracy can be enhanced, over time, by real-time reinforcement feedback from expert humans.

Embodiments of the present invention are inextricably tied to computing at least because they include the implementation of a computer-based method for a practical purpose. Presently, trend recognition is an intensive process that when performed by a human or an existing computing method will produce different results. Thus, the existing computer-based trend recognition methods are not practical based on this discrepancy. Embodiments of the present invention utilize image recognition and image generation by program code to train models to perform trend recognition in a manner that brings the results of this computerized process into conformity (at least to a closer degree) with human trend recognition methods. The human trend recognition is inefficient and impractical on a large scale. Thus, by providing a computerized approach with comparable results to a human approach, but with the ability to provide results in real-time and based on a seemingly unlimited amount of data (which is not possible for a human expert), embodiments of the present invention provide an approach that is inextricably linked to computing (enabled by computing) and that is practical.

Aspects of embodiments of the present invention provide advantages over existing approaches to computerized image recognition at least because aspects of embodiments of the present invention utilize multiple related time series data sets for trend recognition while fully preserving the entire data set within the image. Existing computerized image recognition methods are limited to use within a discrete time period; images are used within machine learning contexts to recognize attributes contained within the image, such as identifying the presence of an apple within a photograph, but the photograph represents a unique moment in time. Aspects of various embodiments of the present invention provide an advantage over these existing (time-limited) techniques because in embodiments of the present invention the program code obtains time series trend data and generates images that represent the data set. The generated images mirror the way an expert human would visually recognize and identify patterns. Additionally, in embodiments of the present invention, this data set to image generation is reversible because the program code generates and image (i.e., a depiction of the data set) and the program code can recreate the underlying data set from the image (e.g., existing approaches do not or cannot compare multiple related time series data sets, while fully preserving the entire data set within an image). Another advantage of embodiments of the present invention over existing techniques is that the trend recognition performed by the program code in embodiments of the present invention is not limited to graphics in a time series. Rather, program code in embodiments of the present invention generates images that represent multiple time series data sets within a single image for the purpose of identifying trends that encompass the grouping of time series data sets, such as analysis of multiple component vintages. Thus, program code in embodiments of the present invention can generate data sets that train computerized models to provide trend recognition results over multi-vintage data sets.

FIG. 1 is an example of an image 100 generated by program code in an embodiment of the present invention that represents a multiple time series vintage trend data set. The columns 110a-110h represent calendar months, with latest on left side 130. The rows 120a-120e represent vintage months, with most recent on bottom 140. Although the embodiments of the invention illustrated depict the newest vintage on the bottom, these embodiments are provided merely to illustrate a possibility. In some embodiments of the present invention, the program code can render an image with the newest vintage on top and subsequent older vintages ordered downward. The orientation selected for depiction herein is provided as an example of a possible orientation. In embodiments of the present invention, regardless of the type of orientation implemented, that implemented orientation (e.g., top to bottom and left to right) is consistent across the system for the purposes of training a neural network. Prior to training, which is discussed herein, the choice of image orientation is arbitrary. The choice of image orientation remains consistent throughout the life of the system once training begins.

Figure 2:
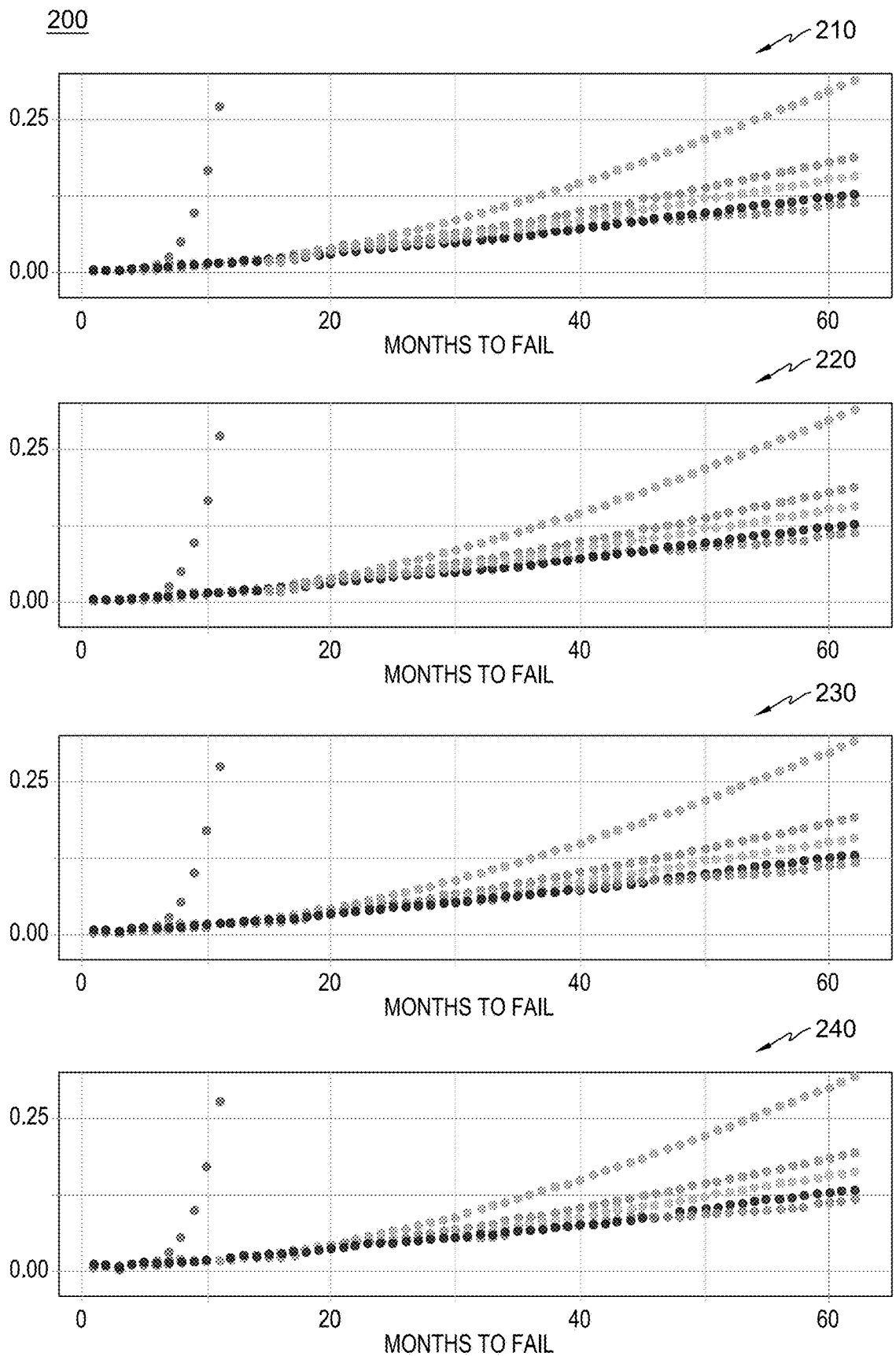
FIG. 2 illustrates a dataset that can be utilized by the program code in various embodiments of the present invention.

The black portions represent alerts (in field quality issue detection) and the gray portions represent an absence of alerts. FIG. 2 represents components of a data set 210 220 230 240 preserved within the image 100 (FIG. 1) generated by the program code. In embodiments of the present invention, by generating the image, the program code compares multiple related time series data sets 210 220 230 240 while fully preserving as the entirety of the data sets 210 220 230 240 in the image 100. Thus, the program code can utilize the image 100 to generate the data sets 210 220 230 240—as aforementioned, an advantage of embodiments of the present invention is that the image generation from the data sets is reversible.

As understood by one of skill in the art, the time window utilized in embodiments of the present invention is arbitrary. Just as certain of the figures utilize a specific orientation merely as an illustrative example of an implementation of aspects of the present invention, FIG. 1 also utilizes months as a time window as a non-limiting example (i.e., the columns 110a-110h represent calendar months and the rows 120a-120e represent vintage months, As aligning vintages based on month boundaries is only one possible implementation, in additional embodiments of the present invention, the program code can align the vintages less granularly (e.g., year, number of years, etc.), or more granularly (e.g., week, day, etc.).

As illustrated in FIGS. 1-2, program code in embodiments of the present invention generates single images 100 that represent multiple time series data sets 210 220 230 240 for the purpose of identifying trends that encompass the grouping of time series data sets 210 220 230 240, such as analysis of multiple component vintages. In embodiments of the present invention, program code executing on at least one processor performs a method for using images that is arguably similar to those recognized by the expert human, however, the data and time limitations introduced by human users are eliminated with the use of a computing system. An example of a limitation is that for a complex data analysis involving multiple outcome variables, it is extremely difficult for a traditional computational and mathematical/statistical (aka multivariate) base approach to achieve excellent results despite decades of research. Meanwhile, embodiments of the present invention can produce results in real-time.

Returning to FIGS. 1-2, to perform the method, the program code utilizes known image recognition techniques used to distinguish different pictures of physical object (e.g., distinguishing a picture of an apple from a picture of a chicken). The program code generates an image 100 the captures the multi-vintage trend analysis representations (data sets 210 220 230 240) used by the expert humans to identify particular multi-time-series trend patterns. By generating the image 100, the program code captures each detail of a group of multiple time series vintage data sets within individual pixels or group of pixels. This aggregation of individual pixels or groups of pixels would be recognizable to the expert human and is also usable by a computing system. The computing system utilizes the generated image 100 to create and train models (e.g., machine-learning algorithms) whose accuracy can be enhanced over time by real-time reinforcement feedback from expert humans. These generated images 100, usable by the computer system, allow for validation and or reclassification by the expert human.

The generated image 100 can be utilized to train cognitive systems to make decisions based on multiple variables. Multivariate techniques (e.g., techniques where multiple variables affect a decision) are utilized when more than one relationship exists amongst variables. One example of a decision based upon multiple variables is the decision to buy a house. Factors such as price, location, safety, property tax rate, age, color, functionality and/or market sentiments can all be considered and can be factors in an eventual decision. Because of the large amount of data, it is difficult to obtain a clear picture and determined how to make a decision (let alone what decision should be made). Manipulating the data into a form that is understandable is desirable and increasingly complex as the number of variables increase. Issues related to the modeling and comprehension of multivariate issues exist in multiple industries, including but not limited to, reliability engineering, stock and financial markets, sales and marketing and where large amount of data is used. A representation enables the training of a cognitive system, but while computer processes can look for trends in the data, in order to achieve the machine-learned results desired, the program code formulates the results in a manner in which a user can interact with the cognitive system in an intuitive way. By generating the image 100 (FIG. 1), the program code presents complex data to a user in a format with which the user can interact. The interactions of the user with the data increases the quality of the training of the cognitive system and allows the results of the system to align with user-generated results, but within a workable timeframe, which cannot be achieved by a user. For the sake of simplicity, the cognitive system and the program code generating the image 100 (FIG. 1) are referred to as comprising two distinct modules. However, in some embodiments of the present invention, program code of a single entity of module Once the program code has generated the image 100 (FIG. 1) from the data sets 210 220 230 240 (FIG. 2), the program code can train an existing cognitive system and/or agent of a cognitive system to analyze the image, including based on existing image recognition techniques, in order to recognize patterns (trends) within the image 100 (and hence, within the data). Because the program code can represent the trends as an image 100, a user can interact with the image 100 and thus, provide a check on the trends recognized by the cognitive system. One such existing cognitive system or agent that can be utilized in embodiments of the present invention is IBM Watson®, which the program code can utilize to perform the image 100 (FIG. 1) analysis described. IBM Watson® is a product of International Business Machines Corporation. IBM Watson® is a registered trademark of International Business Machines Corporation, Armonk, N.Y., US. In embodiments of the present invention, the program code interfaces with IBM Watson® APIs to perform analyses, including but not limited to, analysis of images. APIs of IBM Watson® that can be utilized in various embodiments of the present invention to perform the described analysis to generate the machine learning models, but the analysis can utilize, but is not limited to, Watson's Visual Recognition, which can be utilized to train a custom model for visual inspection and use cases. The IBM Watson Visual Recognition service uses deep learning algorithms to analyze images for scenes, objects, faces, and other content.

As understood by one of skill in the art, IBM Watson® is an example of the type of cognitive agent that can be employed in embodiments of the present invention. However, various existing cognitive agents can also be utilized in embodiments of the present invention. IBM Watson® is a non-limiting example of a cognitive agent that can be utilized in some embodiments of the present invention and is discussed for illustrative purposes, only, and not to imply, implicitly or explicitly, any limitations regarding cognitive agents that can comprise aspects of embodiments of the present invention. Various other APIs and third party solutions outside of IBM Watson® can also be utilized in various embodiments of the present invention to visually recognize and identify patterns within the generated image and the generate and update machine learning models.

Figure 3:
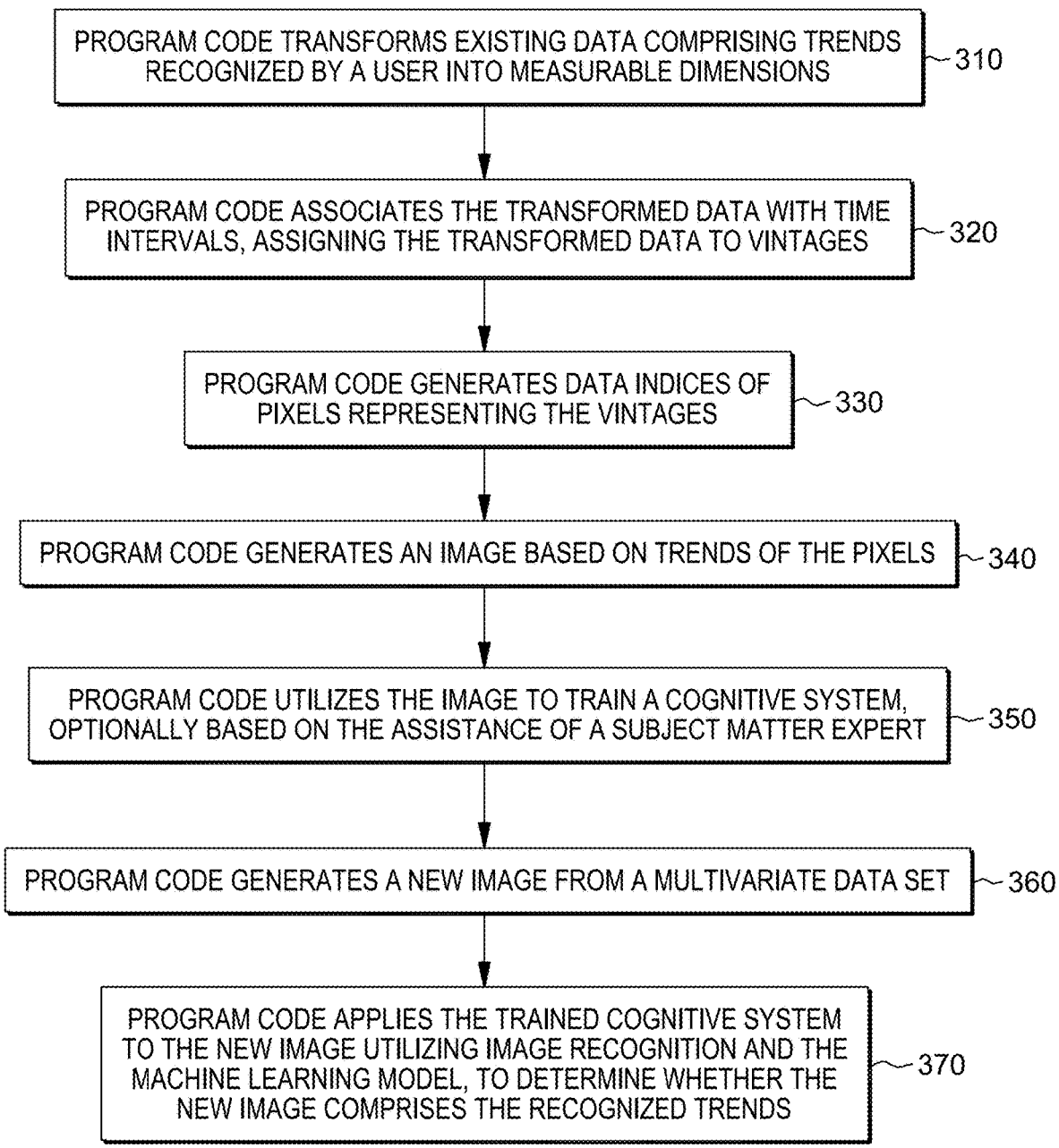
FIG. 3 is a workflow that illustrates certain aspects of some embodiments of the present invention.

FIG. 3 is a workflow 300 that illustrates certain aspect of some embodiments of the present invention and specifically, how program code in embodiments of the present invention utilizes image recognition (upon generating an image) to enable an cognitive system to recognize patterns of vintage failure rates. Failure rates are an example of one aspect in identified patterns that can be recognized based on the images generated in embodiments of the present invention. However, in embodiments of the present invention, where the model is taught to recognize failures, based on the images, these failures could signal an issue that represents a risk for incoming parts. The program code can also utilize the recognized failure patterns for user interaction and thus apply machine learning to tune an established machine learned model. As understood by one of skill in the art, the aspects of some embodiments of the present invention can be utilized to recognize any data trend, including but not limited to, trends in engineering data, financial data, market data, computer system logs, etc. Returning to the failure trend example, Aspects of embodiments of the present invention enable the cognitive system to check part vintages the way a user would, with image recognition.

Referring to FIG. 3, in embodiments of the present invention, program code transforms existing data comprising trends recognized by a user into measurable dimensions (310). FIG. 4 is an example of a portion of a data set 400 that includes trends 410 recognized by a user. As explained earlier, an advantage of some embodiments of the present invention is to bring trends observed by a user, including a subject matter expert, closer to trends that can be observed by a cognitive system applying a machine learning model. In the example in FIG. 4, the user observed clusters of alerts (darkest areas) observed on multiple vintages. These observed trends can be utilized by the cognitive system to detect field quality issues. In FIG. 4, the clusters of black alerts were observed on multiple vintages. The trends in the data set 400 reflect field quality issue detection. The lighter gray areas represent an absence of issues. The lightest areas represent a caution as opposed to an alert. Alerts appear as the darkest areas.

A measurable dimension is composed of quantitative items. The program code associates the transformed data with time (e.g., ARR, PPM), assigning the transformed data to vintages (320). The program code generates data indices of pixels representing the vintages (330). The program code generates an image based on trends of the pixels (340). The program code utilizes the image to train a cognitive system (e.g., a machine learning model applied by the computer system), optionally based on the assistance of a subject matter expert (350). The subject matter expert can provide feedback based on the visualization of the trends provided by the image generated by the program code. The program code generates a new image from a multivariate data set (360). The program code can generate this new image (360) by transforming the data into measurable dimensions, associating the transformed data with time intervals and vintages, generating pixels as data indices representing the vintages, and generating the new image based on the trends of the pixels. The program code applies the trained cognitive system to the new image utilizing image recognition and the machine learning model, to determine whether the new image comprises the recognized trends (370).

Figure 5:
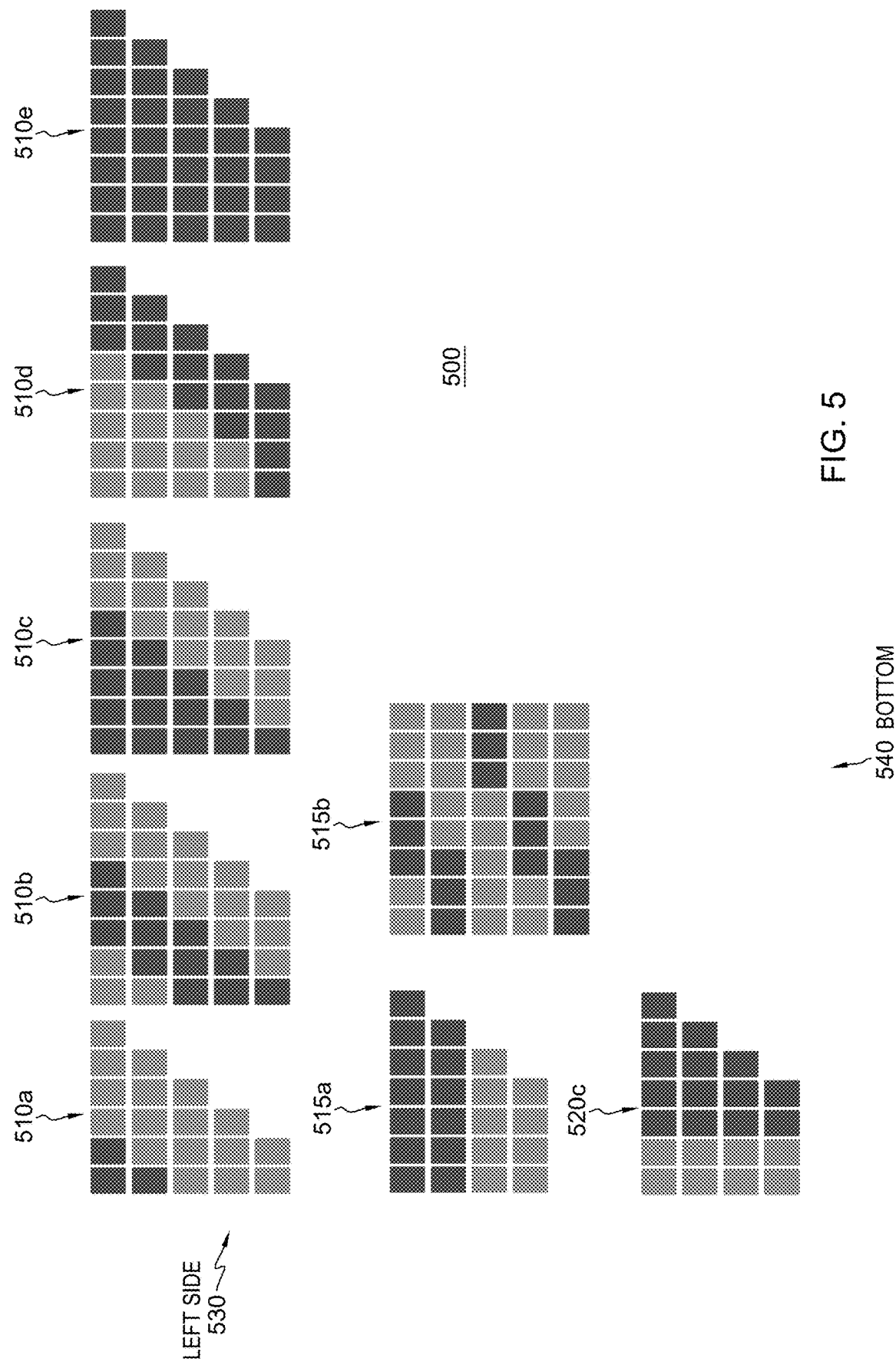
FIG. 5 illustrates various aspects of some embodiments of the present invention.

In embodiments of the present invention, the program code relies upon image recognition to recognize patterns in data sets, rather than business rules, to anticipate and/or predict a likelihood of an event. Thus, images generated by the program code (340) can provide different patterns for cognitive system training. Returning to the part failure rates example, FIG. 5 provides an illustration 500 of different patterns, presented as images generated by the program code, which can be utilized in embodiments of the present invention, to train a cognitive system. In these examples, as in the image 100 in FIG. 1, the columns represent calendar month with the most recent on the left side 530 and the rows are vintage months, with the most recent of the bottom 540.

As with the orientation of the vintages discussed earlier (e.g., top vs. bottom) the left and right orientation selected for depiction herein (e.g., the most recent calendar months on the left side 530) is provided as an example of a possible orientation. In embodiments of the present invention, regardless of the type of orientation implemented, that implemented orientation (e.g., top to bottom and left to right) is consistent across the system for the purposes of training a neural network. Prior to training, the choice of image orientation is arbitrary. The choice of image orientation remains consistent throughout the life of the system once training begins.

Returning to FIG. 5, the black areas (e.g., pixels, groups of pixels) represent observed failures. The lighter gray areas (e.g., pixels, groups of pixels) indicates no observed failures. The various generated images have been separated into high risk patterns 510a-510e, medium risk patterns 515a-515b, and a low risk pattern 520. In some embodiments of the present invention, the program code can provide the high failure rates in vintages to a cognitive system to enable the system to recognize which types of patterns should be trigger failure warnings and which the cognitive system should identify as not representing a risk of failure.

In embodiments of the present invention, even though two different patterns may have the same amount of over target parts, one pattern may be considered not to indicate a (e.g., pre-defined, threshold) risk of failure, while another can trigger an alert and/or further analysis. Some existing methods of failure anticipation attempt to identify over target parts and unlike embodiments of the present invention, do not differentiate between two patterns with similar failure rates. The cognitive system is continuously learning and tuning itself, including based on user feedback. Thus, the program code can identify certain of the patterns that are provided to the cognitive system, via the images generated by the program code, and can utilize machine learning to determine which patterns reliably predict failure and which so not. Thus, in some embodiments of the present invention, the program code generates images based on data sets and provides a cognitive system with patterns of vintage failure rates. The program code of the cognitive system recognizes the patterns of vintage failure rates (based on images generated subsequent to training the system). Based on recognizing the failure rates in the patterns, in some embodiments of the present invention, the program code determines that the pattern recognition is indicative of an issue that presents a risk for incoming parts.

Figure 6:
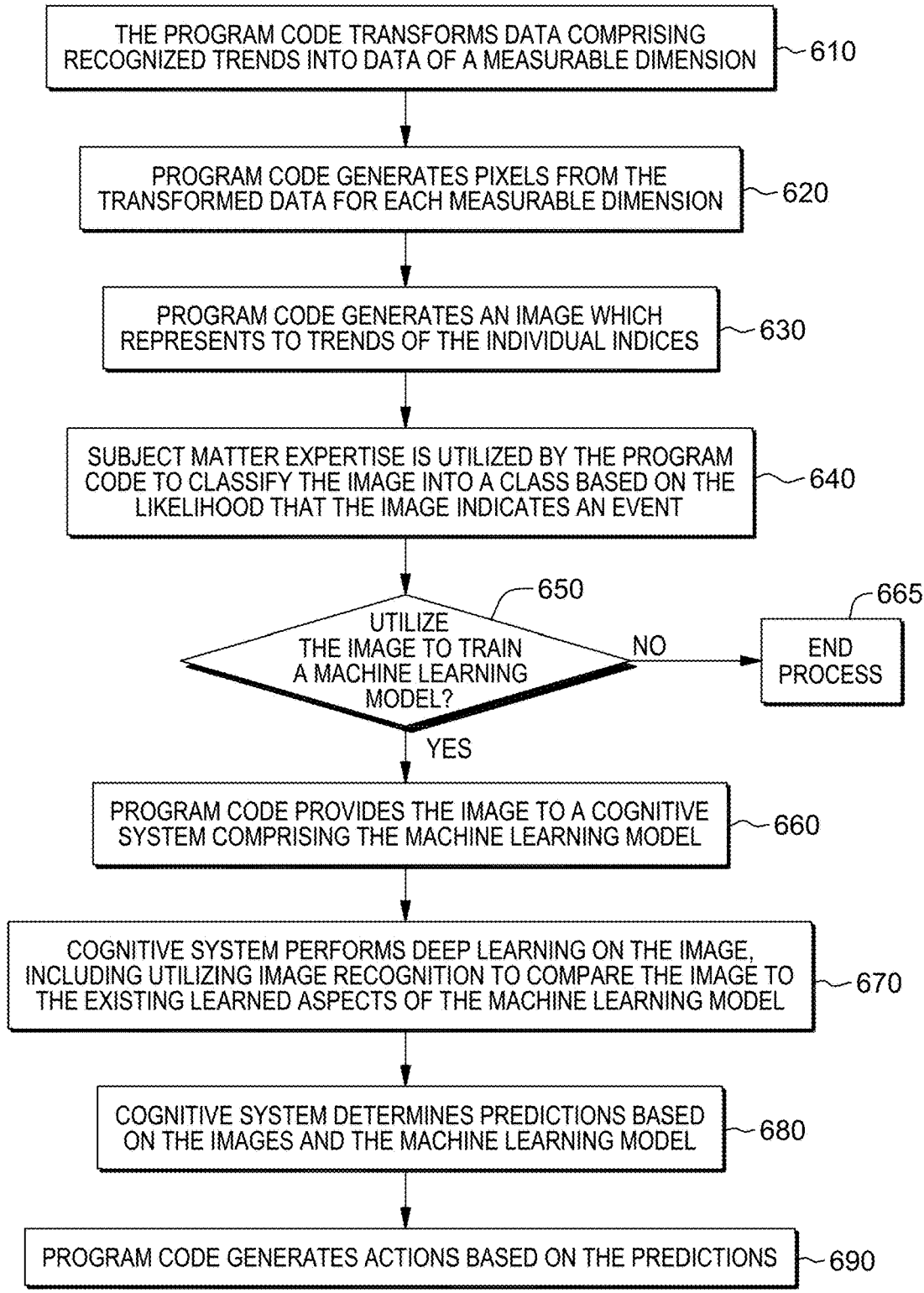
FIG. 6 is a workflow that illustrates certain aspects of some embodiments of the present invention.
Figures 7, 8:
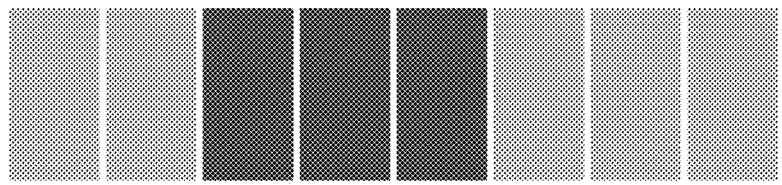
FIG. 7 illustrates a portion of a data set that can be utilized by the program code in various embodiments of the present invention.
FIG. 8 represents an individual group of pixels generated by the program code for a data index in some embodiments of the present invention.

FIG. 6 is a workflow 600 that illustrates various aspects of some embodiments of the present invention. Specifically, FIG. 6 depicts a high level cognitive process initiated by program code in some embodiments of the present invention. In embodiments of the present invention, the program code transforms data comprising recognized trends into data of a measurable dimension (610). FIG. 7 is an example of a data set 700 that can be utilized by the program code in this transformation. The data set 700 is a simplified example that is provided to promote user understanding of the aspects of the illustrated embodiment of the present invention. As understood by one of skill in the art, complex multivariate data can be utilized in embodiments of the present invention. As in FIG. 4, the darkest areas represent failures. The lighter areas represent an absence of the alerts. Just as certain of the figures depict the more recent vintages on a bottom of the image, the coloration of these images and the interpretation of the colors is provided as a non-limiting example. In some embodiments of the present invention, the images generated include areas in gray-scale (with discrete steps or a continuous gradient) as opposed to binary lighter/darker. Additionally, the coloration of various areas can be representation of different types of trends (e.g., not system failures). In some embodiments of the present invention, where the image is not binary, the white can indicate no shipments (i.e., no possibility for returns), slight grey could indicate an alert for shipments with no returns alert, grey could indicate shipments with a low alert level, dark grey could indicate shipments with a medium alert level, and black could indicate shipment with a high alert level. In this example, the alert levels would be based on the annualized return rate of drives within a vintage from the field.

Depending upon whether an image generated by the program code in embodiments of the present invention includes binary coloration, gray-scale gradations, and/or discrete gray-scale steps, each pixels can provide a different type of indication, For example, in a binary image, each pixel represents a presence of an event or an absence of the event while in an image with gray-scale gradations and/or discrete gray-scale steps, the coloration can indicate the presence of an event and/or the severity of the event, or an absence of an event.

Figure 9:
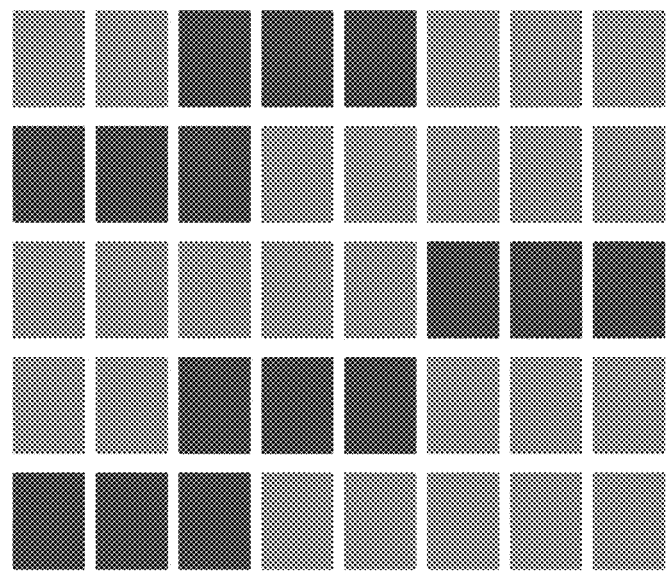
FIG. 9 illustrates various aspects of some embodiments of the present invention.

Returning to FIG. 6, the program code generates pixels from the transformed data for each measurable dimension (e.g., distinct period of time) (620). The program code generates an image which represents the trends of the individual indices (630). The pixels represent data indices that represent a trend, as the data is collected over time. The pixels generated by the program code capture each detail of a group of multiple time series vintage data sets within individual pixels or a group of pixels. The aggregation of individual pixels or groups of pixels by the program code is recognizable to both a subject matter expert and usable by a cognitive system. FIG. 8 represents an individual group of pixels 800 generated by the program code for a data index, and FIG. 9 is an image 900 generated by the program code from the pixels, in which both a user and a cognitive system can recognize the trends of the indices. The same color scheme utilized in FIGS. 1 and 5. The real-world patterns encapsulated in the images are utilized by the cognitive system to anticipate events, based on matching of the patterns to data obtained by the cognitive system. For example, the program code can monitor a given computer system and provide the data to the cognitive system, which determines, based on a machine learning model trained by the patterns, that the data matches a given pattern indicating a given probability for a system failure. The program code obtains an alert from the cognitive system and provides the alert to a user of the system from which the data was obtained.

Returning to FIG. 6, in some embodiments of the present invention, automated and/or user-provided, subject matter expertise is utilized by the program code to classify the image into a class based on the likelihood that the image indicates an event (640). For example, the program code can display the image in a graphical user interface of a computing device and enable the user to adjust aspects of the image and/or approve of or reject the image (i.e., the trends in the image). The utilization of subject matter expertise can be understood as cognitive learning.

Returning to FIG. 5, the assessed risk levels associated with the generated images (e.g., high risk patterns 510a-510e, medium risk patterns 515a, and a low risk pattern 520), are an example of a classification that can be introduced by subject matter expertise. This aspect of some embodiments of the present invention can be understood as quality control and/or providing cognitive learning to tune data utilized to train a cognitive system which will utilize the image to perform image recognition to predict system events (e.g., failures, session expirations, incursions into a network, software issues, hardware issues, loss of services, bandwidth limitations, service limitations, etc.), based on monitoring system resources, in real-time. In some embodiments of the present invention, the subject matter expertise can be utilized to classify an image based on the type of event it can assist a cognitive system in anticipating, based on the pattern in the image.

In embodiments of the present invention, the program code determines, based on the classification, whether to utilize the image (e.g., pattern) to train a machine learning model (650). A decision regarding whether to train a model can be made based on established criteria, including but not limited to, an urgency associated with the image, an adjudged quality of the image, and/or whether the image provides a pattern related to an event for which a user desires a model to be trained to recognize. Based on determining that the image should be utilized to train a machine learning model, the program code provides the image to a cognitive system comprising the machine learning model (660). In the event that the image/pattern is not utilized to train the model, the process can end (665). In some embodiments of the present invention, the program code is a component of the cognitive system.

Based on obtaining the image, the cognitive system performs deep learning on the image, including utilizing image recognition to compare the image to the existing learned aspects of the machine learning model (670). In some embodiments of the present invention, the cognitive system can utilize a neural network to perform this deep learning aspects. Neural networks are a biologically-inspired programming paradigm which enable a computer to learn from data, in this case, data provided via the image. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns and attributes in data. Thus, deep learning can be utilized to perform pattern recognition in complex images provided to the cognitive system, which represent observed patterns (e.g., data sets). Because of the speed and efficiency of neural networks, especially when parsing multiple complex data sets, neural networks and deep learning provide solutions to ingesting and organizing data in diverse formats. Thus, neural networks can be used to perform image recognition, enabling the comparison of complex patterns to train the machine learning model to recognize and predict events with increased accuracy.

Some embodiments of the present invention may utilize a neural network to predict additional events for inclusion in the data structure (e.g., machine learning model), based on the images provided. Utilizing the neural network, the program code can predict subsequent data. The program code obtains (or derives) the initial attributes from an image to generate an array of values (possible attributes) to input into input neurons of the neural network. Responsive to these inputs, the output neurons of the neural network produce an array that includes the identified attributes as well as the predicted attributes. The neural network can also be utilized to process the data of multiple images simultaneously, and in processing these data, the program code can generate and predict relationships between images for utilization in the data structures.

In some embodiments of the present invention, a neuromorphic processor or trained neuromorphic chip can be incorporated into the computing resources executing the program code. One example of a trained neuromorphic chip that can be utilized in an embodiment of the present invention is the IBM® TrueNorth chip, produced by International Business Machines Corporation. IBM® is a registered trademark of International Business Machines Corporation, Armonk, N.Y., U.S.A.

In some embodiments of the present invention, the deep learning can be performed by taking advantage of available features of the deep learning service within IBM Watson® Studio. This service enables a user to visually design the neural network and scale out their training runs and to select resources for use as a preferred deep learning framework. The neural network can be accessed in a shared computing system, including but not limited to in a cloud, and/or at an edge of a network.

Returning to FIG. 6, based on the deep learning, the cognitive system determines predictions based on the images and the machine learning model (680). In some embodiments of the present invention, the predictions are related to the classification of the image. For example, the program code can generate predictions related to a high risk of a system failure based on utilizing an image classified as high risk the train the model. The program code generates actions (e.g., alerts) based on the predictions (690). In some embodiments of the present invention, a subject matter expert reviews the alerts for accuracy and adjusts the classification of the image (moving forward). The cognitive system can then perform deep learning utilizing image recognition on the reclassified image and adjust the machine learning model accordingly. Thus, the learning process can be cyclical, with the model being tuned through use. Once trained, the cognitive system can be utilized to monitor systems for events and the cognitive system can provide alerts when the machine learning model indicates an event (e.g., a risk of failure exceeding an established threshold), based on an image of a data set of the system being monitored being compared (by program code of the cognitive system) to the images comprising the machine learning model. Thus, in embodiments of the present invention, program code executing on at least one processing resource detects trends by using image generation and image/pattern recognition.

Figure 10:
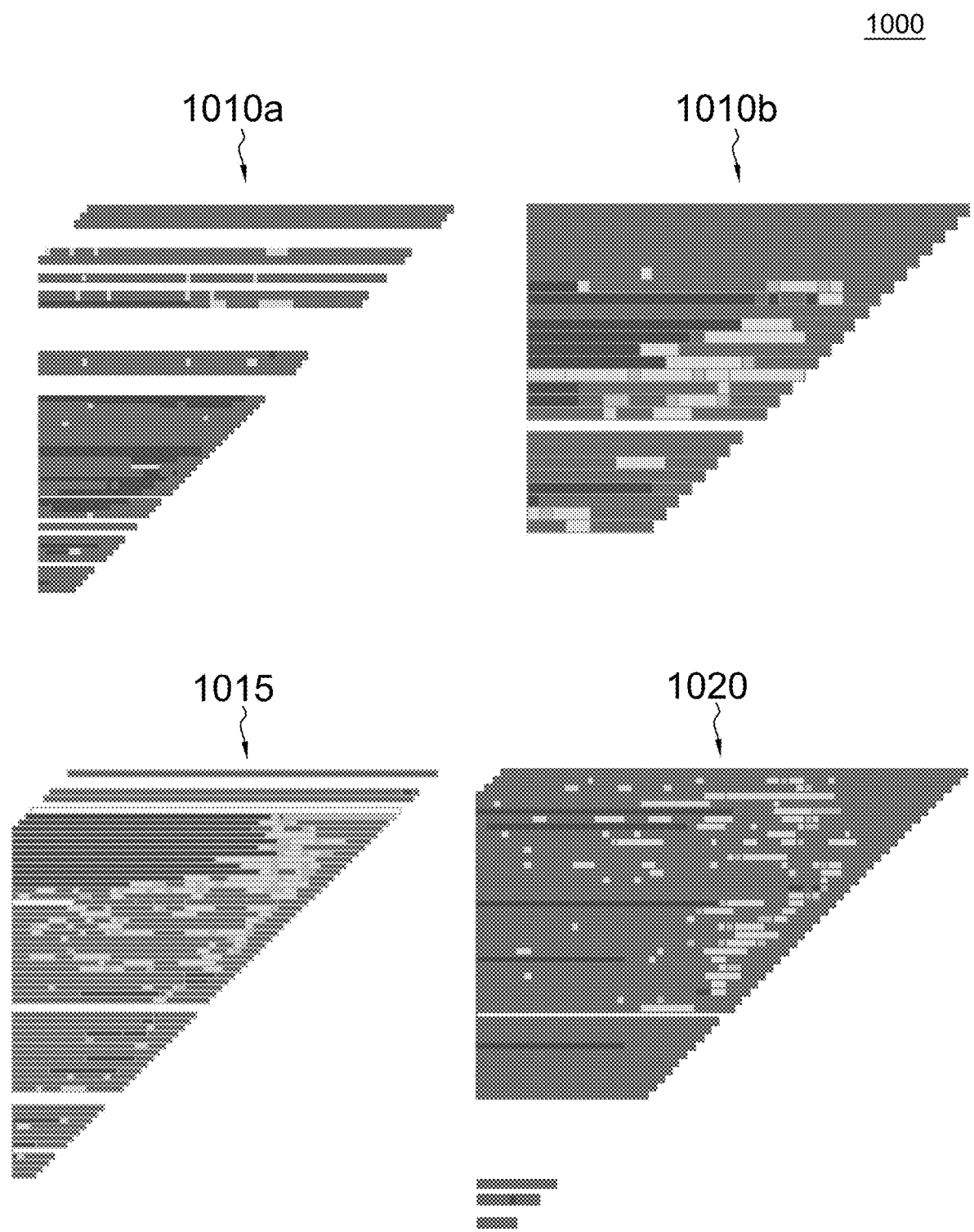
FIG. 10 illustrates various aspects of some embodiments of the present invention.

As mentioned above, the images illustrated in various figures are provided in a simplified format for ease of comprehension. Embodiments of the present invention can generate images that provide a cognitive system (e.g., cognitive agent) with more complex patterns to later recognize in data sets related to monitored systems (or other data sets, monitored system are used as an example). FIG. 10 provides images 1000 of real-world (more complex) patterns in images, an illustration of two images 1010a 1010b that include patterns indicative of a high risk of an event, an image 1015 that includes a pattern that indicates a medium risk of an event, and an image 1020 that includes a pattern that indicates a low risk of an event. The darkest portions of these images represent events (e.g., failures, etc.), the lightest portions represent a risk but not a realization of the events, and the portions that are in the middle represent the absence of events.

Embodiments of the present invention include a computer-implemented method, a computer program product, and a computer system, where program code obtains data comprising trends recognized by an observer of a system over time, where the data is comprised of more than one vintage. The program code transforms the data comprising the trends into measurable dimensions, where the transforming further comprises assigning the transformed data to vintages and to distinct periods of time. The program code generates, from the transformed data assigned to the vintages, an image, where the image represents the trends, organized by the distinct periods of times and the vintages.

In some embodiments of the present invention, the image comprises at least one row of pixels and at least one column of pixels. Each pixel comprising the at least one row of pixels and the at least one column of pixels can represent an index, and the image can represent the trends recognized by the observer based on representing trends of the index of each pixel. Each column of the at least one column can represent a distinct period of time of the distinct periods of time, and each row of the at least one row can represent a vintage of the more than one vintage.

In some embodiments of the present invention, most recent distinct periods of time of the distinct periods of time are on given side of the image, wherein the sides are selected from the group consisting of: a left side of the image, a right side of the image, a top of the image, and a bottom of the image.

In some embodiments of the present invention, most recent vintages of the more than one vintage are located toward an edge of an image, wherein the edge is selected from: a bottom of the image, a top of the image, a left side of the image, and a right side of the image.

In some embodiments of the present invention, each distinct period of time of the distinct periods of time comprises a calendar time window, and each vintage of the more than one vintage comprises a vintage time window month and the time window is selected from the group consisting of: a day, a week, and a month.

In some embodiments of the present invention, the image comprises pixels, and each pixel represents at least one of: a presence of an event, a severity of the event, and an absence of the event.

In some embodiments of the present invention, the program code classifies the image based on the trends. In some embodiments of the present invention, the program code performs deep learning on the image, where the deep learning comprises utilizing image recognition to compare patterns comprising the image to known patterns, where the know patterns are embodied in a machine learning model stored in a memory accessible to the one or more processors and updating, the machine learning model based on the deep learning.

In some embodiments of the present invention, the program code determines predicted behaviors of the system, based on the updated machine learning model and configures alerts, based on the predicted behaviors.

In some embodiments of the present invention, the program code monitors the system to accumulate performance data. The program code transforms the performance data into measurable dimensions, where the transforming further comprises assigning the transformed performance data to the vintages and to the distinct periods of time. The program code generates, from the transformed performance data assigned to the vintages, a new image. The program code cognitively analyzes the new image, utilizing the machine learning model, where the cognitively analyzing comprises performing image recognition on the new image, based on comparing the new image to the image. The program code can identify, based on the cognitively analyzing, a common trend in the new image and the image, where the common trend indicates a predicted behavior and generate an alert from the configured alerts, based on the predicted behavior. The program code can providing the alert to a user of the system.

In some embodiments of the present invention, as part of classifying, the program code categorizes the image based on anticipated risk of the trends to the system.

In some embodiments of the present invention, the event comprises a failure in at least on component of the system.

Referring now to FIG. 11, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the processors executing the program code referenced in FIGS. 3 and 6 as well as the processors executing the cognitive system, which can be the same processor(s) and/or different processors than the processors executing the program code can each be understood as a cloud computing node 10 (FIG. 11) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
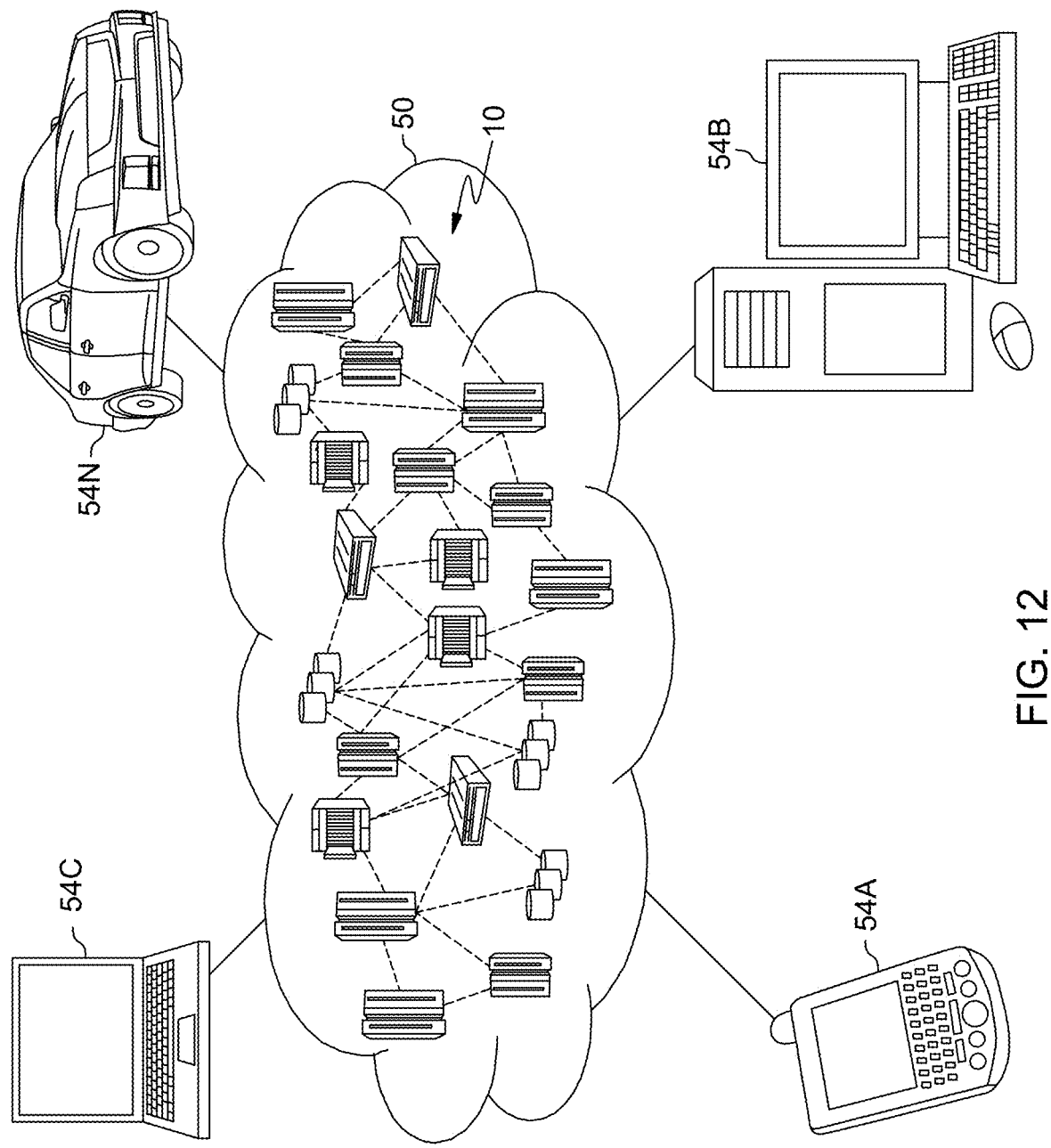
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
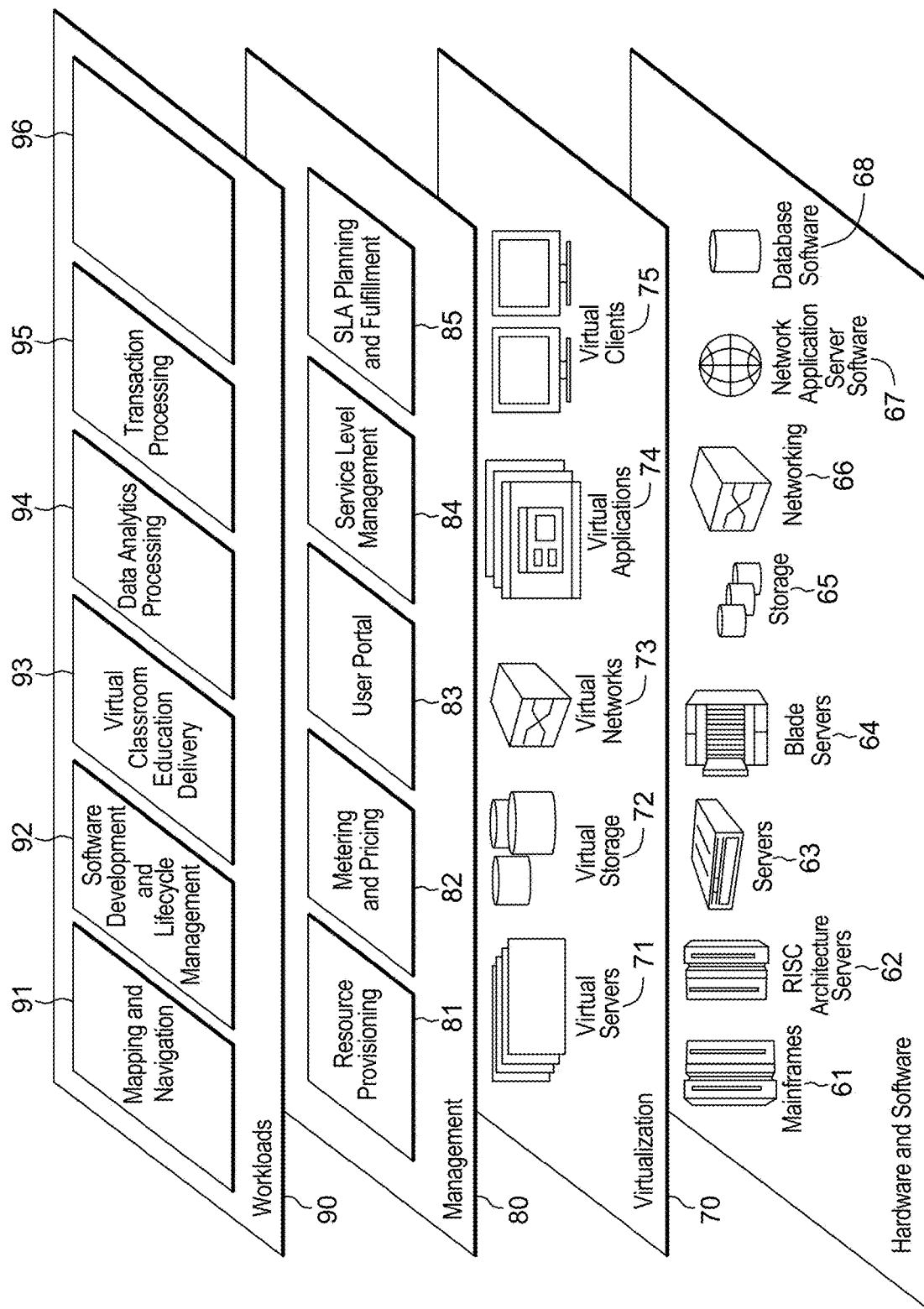
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating an image comprising patterns utilized to train a machine learning model to recognize events in data sets 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   monitoring, by one or more processors, in real-time, resources comprising a computing system to identify events in the computing system and timing of the events, wherein the events and the timing of the events over a pre-defined period of time comprise time series trend data, wherein the pre-defined period of time comprises more than one vintage, wherein each vintage of the more than one vintage comprises a collection of contemporaneous events, wherein a portion of the events comprise system failures;
   obtaining, by the one or more processors, the time series trend data;
   transforming, by the one or more processors, the time series trend data into measurable dimensions, wherein the transforming further comprises assigning the transformed data to vintages of the more than one vintage and to distinct periods of time, wherein the transforming comprises generating, by the one or more processors, pixels as data indices representing the more than one vintage; and
   generating, by the one or more processors, from the transformed data assigned to the vintages, an image, wherein the image represents trends in the time series trend data, organized by the distinct periods of times and the vintages, wherein each pixel represents a presence of an event or an absence of the event of the monitored events comprising the time series trend data, and wherein a color of each pixel representing the presence of an event indicates a severity of the event, wherein the image comprises at least one row of pixels and at least one column of pixels, wherein each column of the at least one column represents a distinct period of time of the distinct periods of time, and wherein each row of the at least one row represents a vintage of the more than one vintage.

2. The computer-implemented method of claim 1, wherein each pixel comprising the at least one row of pixels and the at least one column of pixels represents an index, and wherein the image represents the trends recognized by the monitoring observer based on representing trends of the index of each pixel.

3. The computer-implemented method of claim 2, wherein most recent distinct periods of time of the distinct periods of time are on given side of the image, wherein the sides are selected from the group consisting of: a left side of the image, a right side of the image, a top of the image, and a bottom of the image.

4. The computer-implemented method of claim 2, wherein most recent vintages of the more than one vintage are located toward an edge of an image, wherein the edge is selected from: a bottom of the image, a top of the image, a left side of the image, and a right side of the image.

5. The computer-implemented method of claim 1, wherein each distinct period of time of the distinct periods of time comprises a calendar time window, and each vintage of the more than one vintage comprises a vintage time window, wherein the time window is selected from the group consisting of: a day, a week, and a month.

6. The computer-implemented method of claim 1, further comprising:
classifying, by the one or more processors, the image based on the trends.

7. The computer-implemented method of claim 6, further comprising:
performing, by the one or more processors, deep learning on the image, wherein the deep learning comprises utilizing image recognition to compare patterns comprising the image to known patterns for predicting system failures, wherein the know patterns are embodied in a machine learning model stored in a memory accessible to the one or more processors; and
updating, by the one or more processors, the machine learning model based on the deep learning.

8. The computer-implemented method of claim 7, further comprising:
predicting, by the one or more processors, future system failures based on the updated machine learning model; and
configuring, by the one or more processors, alerts, based on the predicted future system failures.

9. The computer-implemented method of claim 8, further comprising:
monitoring, by the one or more processors, the system to accumulate performance data;
transforming, by the one or more processors, the performance data into measurable dimensions, wherein the transforming further comprises assigning the transformed performance data to the vintages and to the distinct periods of time;
generating, by the one or more processors, from the transformed performance data assigned to the vintages, a new image; and
cognitively analyzing, by the one or more processors, the new image, utilizing the machine learning model, wherein the cognitively analyzing comprises performing image recognition on the new image, based on comparing the new image to the image.

10. The computer-implemented method of claim 9, further comprising:
identifying, based on the cognitively analyzing, by the one or more processors, a common trend in the new image and the image, wherein the common trend indicates a predicted behavior; and
generating, by the one or more processors, an alert from the configured alerts, based on the predicted behavior.

11. The computer-implemented method of claim 10, further comprising:
providing, by the one or more processors, the alert to a user of the system.

12. The computer-implemented method of claim 6, wherein the classifying comprises categorizing the image based on anticipated risk of the trends to the system.

13. A computer program product comprising:
a computer readable storage medium readable by one or more processors and storing instructions for execution by the one or more processors for performing a method comprising:
monitoring, by the one or more processors, in real-time, resources comprising a computing system to identify events in the computing system and timing of the events, wherein the events and the timing of the events over a pre-defined period of time comprise time series trend data, wherein the pre-defined period of time comprises more than one vintage, wherein each vintage of the more than one vintage comprises a collection of contemporaneous events, wherein a portion of the events comprise system failures;
obtaining, by the one or more processors, the time series trend data;
transforming, by the one or more processors, the time series trend data into measurable dimensions, wherein the transforming further comprises assigning the transformed data to vintages of the more than one vintage and to distinct periods of time, wherein the transforming comprises generating, by the one or more processors, pixels as data indices representing the more than one vintage; and
generating, by the one or more processors, from the transformed data assigned to the vintages, an image, wherein the image represents trends in the time series trend data, organized by the distinct periods of times and the vintages, wherein each pixel represents a presence of an event or an absence of the event of the monitored events comprising the time series trend data, and wherein a color of each pixel representing the presence of an event indicates a severity of the event, wherein the image comprises at least one row of pixels and at least one column of pixels, wherein each column of the at least one column represents a distinct period of time of the distinct periods of time, and wherein each row of the at least one row represents a vintage of the more than one vintage.

14. The computer program product of claim 13, wherein each pixel comprising the at least one row of pixels and the at least one column of pixels represents an index, and wherein the image represents the trends recognized by the monitoring based on representing trends of the index of each pixel.

15. A system comprising:
a memory;
one or more processors in communication with the memory;
program instructions executable by the one or more processors via the memory to perform a method, the method comprising:
monitoring, by the one or more processors, in real-time, resources comprising a computing system to identify events in the computing system and timing of the events, wherein the events and the timing of the events over a pre-defined period of time comprise time series trend data, wherein the pre-defined period of time comprises more than one vintage, wherein each vintage of the more than one vintage comprises a collection of contemporaneous events, wherein a portion of the events comprise system failures;
obtaining, by the one or more processors, the time series trend data;
transforming, by the one or more processors, the time series trend data into measurable dimensions, wherein the transforming further comprises assigning the transformed data to vintages of the more than one vintage and to distinct periods of time, wherein the transforming comprises generating, by the one or more processors, pixels as data indices representing the more than one vintage; and generating, by the one or more processors, from the transformed data assigned to the vintages, an image, wherein the image represents trends in the time series trend data, organized by the distinct periods of times and the vintages, wherein each pixel represents a presence of an event or an absence of the event of the monitored events comprising the time series trend data, and wherein a color of each pixel representing the presence of an event indicates a severity of the event, wherein the image comprises at least one row of pixels and at least one column of pixels, wherein each column of the at least one column represents a distinct period of time of the distinct periods of time, and wherein each row of the at least one row represents a vintage of the more than one vintage.

16. The computer program product of claim 13, the method further comprising:

performing, by the one or more processors, deep learning on the image, wherein the deep learning comprises utilizing image recognition to compare patterns comprising the image to known patterns for predicting system failures, wherein the know patterns are embodied in a machine learning model stored in a memory accessible to the one or more processors;

updating, by the one or more processors, the machine learning model based on the deep learning; and predicting, by the one or more processors, future system failures based on the updated machine learning model.

17. The system of claim 15, the method further comprising:

performing, by the one or more processors, deep learning on the image, wherein the deep learning comprises utilizing image recognition to compare patterns comprising the image to known patterns for predicting system failures, wherein the know patterns are embodied in a machine learning model stored in a memory accessible to the one or more processors;

updating, by the one or more processors, the machine learning model based on the deep learning; and predicting, by the one or more processors, future system failures based on the updated machine learning model.

* * * * *